United States Patent

Kobayashi et al.

Patent Number: 5,277,217
Date of Patent: Jan. 11, 1994

[54] FUEL INTERRUPT/PRESSURE RELEASE VALVE ARRANGEMENT FOR FUEL TANK

[75] Inventors: Jiro Kobayashi; Harumitsu Sugiyama; Michael J. Feely, all of Kanagawa, Japan

[73] Assignees: Nissan Motor Co., Ltd.; Kato Hatsujo Kaisha Limited, both of Yokohama, Japan

[21] Appl. No.: 895,379

[22] Filed: Jun. 9, 1992

[30] Foreign Application Priority Data

Jun. 14, 1991 [JP] Japan ................... 3-142220

[51] Int. Cl.⁵ ............................... F16K 17/36
[52] U.S. Cl. ........................ 137/39; 137/43; 137/202
[58] Field of Search ............ 137/39, 43, 202, 587, 137/589

[56] References Cited

U.S. PATENT DOCUMENTS 4,989,629  2/1991  Shirakawa ............... 137/202
5,004,002  4/1991  Kobayashi .............. 137/39

FOREIGN PATENT DOCUMENTS 62-75278  6/1987  Japan.

Primary Examiner—Robert G. Nilson
Attorney, Agent, or Firm—Lowe, Price, LeBlanc & Becker

[57] ABSTRACT

A fuel interrupt/pressure release valve arrangement includes a casing mounted at an upper portion of an interior space of a fuel tank. The casing has openings for communicating the interior of the casing with an atmosphere the interior of the fuel tank. A valve housing is formed in the casing having a discharge opening at an upper end. The opening is closed by a stopper biased in a valve closing direction by a spring. A float is provided in the casing having an indentation for loosely receiving the valve housing and a through hole is formed through the float at an apex of the indentation corresponding to the position of the discharge opening of the valve housing. A protrusion formed on the float in the vicinity of the through hole so as to project in an opening direction of the valve so as to be normally in touching contact with the stopper. The buoyancy of the float is determined as to be urged in a valve closing direction by the presence of liquid state fuel in the casing and to be urged in a valve opening direction proportionally according to presence of fluid pressure of evaporated fuel in the casing. The buoyancy determined for the presence of liquid state fuel is less than the spring force of the spring by a predetermined degree.

13 Claims, 4 Drawing Sheets

FUEL INTERRUPT/PRESSURE RELEASE VALVE ARRANGEMENT FOR FUEL TANK

BACKGROUND OF THE INVENTION

1. Field of the Invention

The present invention relates generally to a fuel interrupt arrangement for an automotive fuel tank. Particularly, the present invention relates to a fuel interrupt/pressure release valve arrangement for a fuel tank which can prevent overflow, or spillage of fuel to the outside of a fuel tank when a vehicle operates or parks on inclines, hill, steep angles etc., or when a vehicle is in a roll-over condition.

2. Description of the Prior Art

A fuel interrupt arrangement is well known which is provided for preventing spillage of fuel when a vehicle operates on inclines, or turns etc. In such a fuel interrupt arrangement, a float is provided for blocking an outlet from a fuel tank, which outlet is normally connected to an evaporation tube and a canister. In such arrangement, when a vehicle turns or operates on a hill, etc., the float is buoyed upward. An upper surface of the float is provided with means for blocking the fuel tank outlet thus preventing spillage of fuel.

However, in such arrangements, if a pressure within a fuel tank is substantially high, separation between the upper surface of the float and the outlet may be prevented, causing the valve to become stuck. To prevent this, the float must be made substantially large and heavy, increasing vehicle weight and taking up space in the fuel tank.

To prevent sticking, a fuel interrupt arrangement for preventing spillage of fuel outside of a vehicle fuel tank has been disclosed in Japanese Utility Model First Publication (unexamined) No. 62-75278. In the above mentioned application, a casing of the fuel interrupt arrangement is provided with a release valve thereon. Thus according to this structure, when the float closes the outlet and pressure within the fuel tank is substantially high, the release valve opens to release pressure within the tank to prevent sticking of the valve. In this arrangement, a valve opening pressure must be selected below a pressure at which sticking occurs (hereinbelow, sticking pressure), according to this, if a release pressure is to be set substantially low, the sticking pressure must be lowered accordingly, requiring a larger float. Accordingly, there no practical way to increase the sticking pressure beyond a certain level.

Therefore, it has been required to provide a release valve which can resist sticking thereof and in which a sticking pressure can be suitably set and which is substantially small in size and low in cost.

SUMMARY OF THE INVENTION

It is therefore a principal object of the present invention to provide a fuel interrupt/pressure release valve arrangement for a fuel tank which can overcome the drawbacks of the prior art.

In order to accomplish the aforementioned and other objects, a fuel interrupt/pressure release valve arrangement for a fuel tank is provided, comprising: a casing mounted on an upper interior surface of the fuel tank and including openings communicating between an interior of the fuel tank and an interior of the casing, a valve housing including a discharge opening at one end thereof, biasing means positioned within the valve housing and biased in the direction of the discharge opening, closing means urged by the biasing means to a valve closed position in which the closing means blocks the discharge opening, outlet means communicating with the valve housing, and a float, formed separately from the closing means, the float having an indentation for loosely receiving the valve housing, a through hole being formed through the float at an apex of the indentation and a protrusion formed in the vicinity of the through hole the protrusion projecting in an opening direction of the valve so as to be normally in touching contact with the closing means, a buoyancy of the float being so determined as to be urged in a valve closing direction by the presence of liquid state fuel in the casing and to be urged in a valve opening direction proportionally according to a degree of fluid pressure of evaporated fuel in the casing, the buoyancy determined for the float being less than an urging force of the biasing means by a predetermined degree.

According to another aspect of the present invention, a fuel interrupt/pressure release valve arrangement for a fuel tank, comprising: an upper casing including an outlet passage and a flange portion at a perimeter thereof and including a lower projecting portion projecting below the flange, the lower projecting portion having a groove provided thereon and, the flange portion having a diameter greater than the lower projecting portion, a lower casing including a valve housing formed therein, the valve housing having a discharge opening formed therein, the lower casing including openings therethrough and an upper side portion thereof having a hook portion engaging the groove of the upper casing and an upper edge thereof having a flange formed thereon corresponding to the flange of the upper casing, a passage portion of the lower casing being formed so as to communicate the valve housing to the outlet passage of the upper casing, seal means provided at the passage portion of the lower casing where the passage portion contacts the outlet portion of the upper casing, biasing means positioned within the valve housing and biased in the direction of the discharge opening, closing means urged by the biasing means to a valve closed position in which the closing means blocks the discharge opening, and a float formed separately from the closing means and positioned between the upper and lower casings, the float having an indentation for loosely receiving the valve housing, a through hole being formed through the float at a top portion of the indentation and a protrusion formed in the vicinity of the through hole the protrusion projecting in an opening direction of the valve so as to be normally in touching contact with the closing means, a buoyancy of the float being so determined as to be urged in a valve closing direction by the presence of liquid state fuel in the casing and to be urged in the valve opening direction proportionally according to a degree of fluid pressure of evaporated fuel in the casing, the buoyancy determined for the float being less than an urging force of the biasing means by a predetermined degree.

DESCRIPTION OF THE PREFERRED EMBODIMENT

Figure 1:
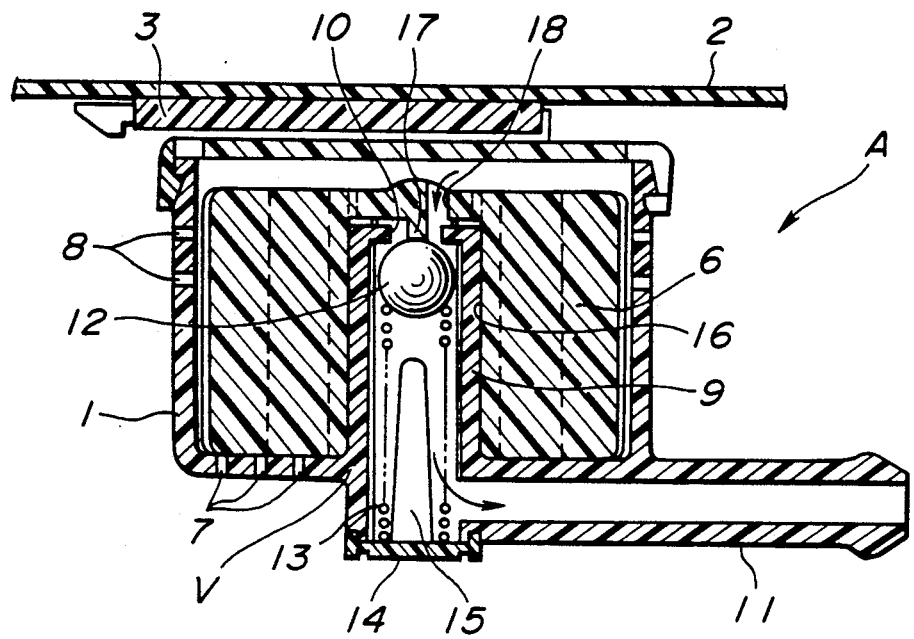
FIG. 1 is a cross-sectional view of a first embodiment of a fuel interrupt/pressure release valve arrangement in a normal state, according to the invention.
Figure 2:
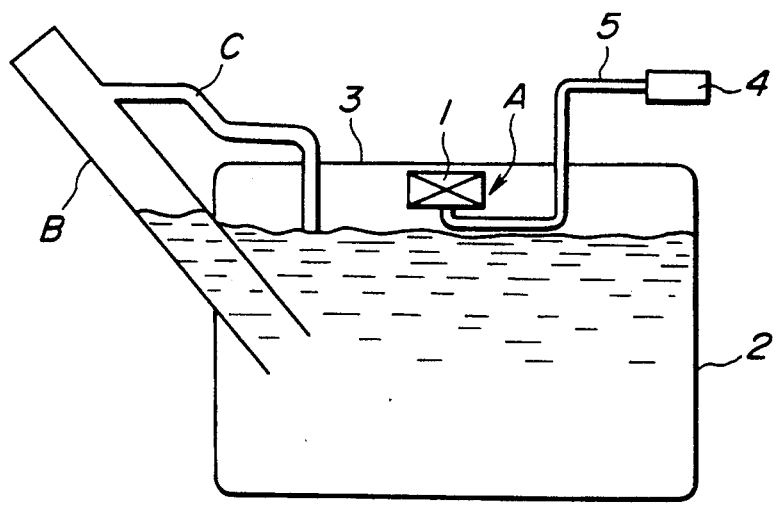
FIG. 2 is a schematic view of the fuel interrupt/pressure release valve arrangement of FIG. 1 as mounted in a fuel tank.

Referring now to the drawings, particularly to FIG. 1, a fuel interrupt/pressure release valve arrangement A according to the present invention comprises an outer casing 1 which is affixed to an upper interior surface of a fuel tank 2 by means of a bracket 3. The fuel tank includes a fill tube B for introducing fuel to the tank 2 and a vent or return tube C for preventing overflow of the fill tube B.

The fuel interrupt/pressure release valve arrangement A further includes an evaporation tube 5 connected from an outlet opening of the casing 1 to an evaporation canister 4. The casing 1 has bottom openings 7 and side openings 8 for allowing fuel to enter into the interior of the casing 1 to provide buoyancy for a float 6. At a lower, central portion of the casing bottom, a valve housing 9 consisting of vertical circular tube-like protuberance is provided. At an upper end of an interior space of the valve housing a fuel discharge opening 10 is formed. Also, connecting from a lower portion of the valve housing 9 to the outside of the casing an outlet 11 is formed, the outlet 11 may be formed integrally with the casing, for example. As mentioned above, the outlet 11 is connected to an evaporation tube 5. A closing member 12, formed as a ball in this embodiment, is provided within the interior space of the valve housing for closing the above mentioned discharge opening. The closing member is biased in the upward direction by a coil spring 13. A cap 14 is provided at a bottom side of the valve housing 9 for preventing fuel from entering the valve directly, further a stopper 15, which may be formed integrally with the cap for example, is provided for limiting positional variation of the closing member 12 within a predetermined range.

A center bottom surface portion of the float 6 is has an indent portion 16 to accommodate the valve housing 9. A center portion of the upper surface of the indent portion 16 has a projecting portion 17 formed thereon, projecting in the downward direction. The projecting portion 17 fits in the discharge opening 10 and may touchingly contact the closing means 12. Beside the projecting portion 17 through the upper surface of the indent portion 16, a through hole 18 is formed.

In a closed condition of the valve V (closing means 12 is in the upper direction of FIG. 1), the discharge opening is held closed by the closing means 12, urged by the spring 13. The spring force of the spring 13 is selected so as to hold the discharge opening closed against the weight of the float via the closing means 12. Thus, except in a case of vehicle rolling, touching contact is always maintained between the projecting portion 17 and the closing means 12.

Thus, in a normal position as shown in FIG. 1, that is, when a vehicle is not inclined or turning, if a fluid pressure, for example, evaporated fuel vapor in the tank 2, rises, the float is pushed down against the closing means 12, which in turn is urged downward against the spring force of the spring 13 to open the discharge opening proportionally to the fluid pressure in the casing 1 to allow pressure within the tank 2 to be relieved via the discharge opening 10, the outlet 11, the evaporation tube 5 and the canister 4. According to the above, a fuel vapor pressure in the tank 2 is held at a selected threshold.

Figure 3:
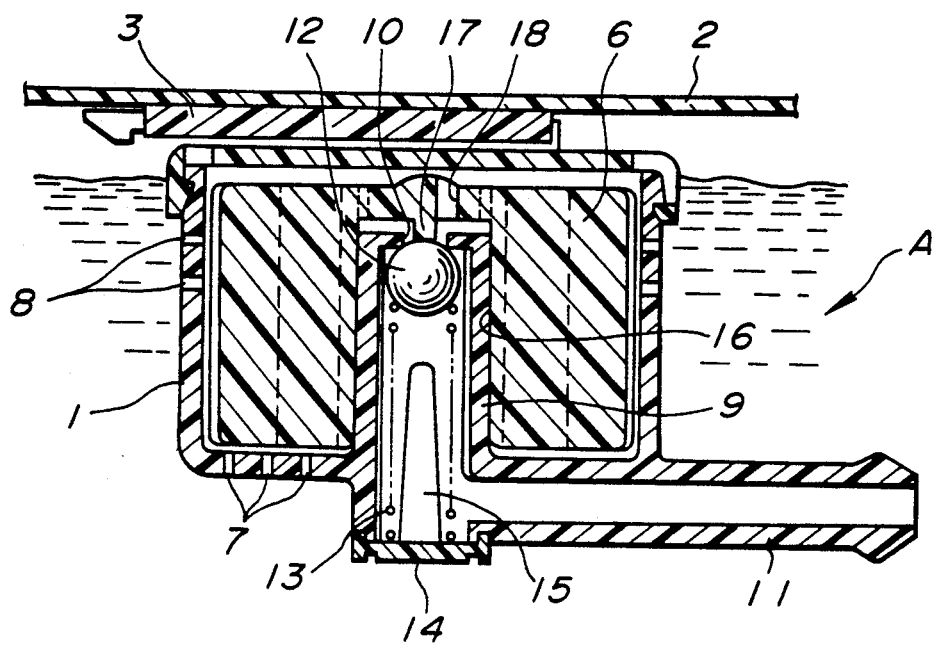
FIG. 3 is a cross-sectional view of the first embodiment of a fuel interrupt/pressure release valve arrangement in a vehicle turning or inclined position.

In a condition where a vehicle is turning or inclined, as pictured in FIG. 3, liquid state fuel may enter the casing, the float 6 therefore is of a material selected so as to be slightly more buoyant in the fuel than a dead weight thereof so as to be moved upwardly by the presence of liquid state fuel in the casing 1, thus closing the discharge opening 10. So, in a condition of turning or inclining of the vehicle, particularly when a level of fuel in the tank is substantially high, leakage of liquid state fuel from the tank is prevented.

Thus, according to the above-described embodiment, sticking of the valve is suitably prevented as the float is urged upwardly by the spring 13 and liquid state fuel and, conversely urged downward by fluid pressure of evaporated fuel in the tank 1.

Further, as mentioned above, the buoyancy of the float 6 is selected so as to be urged upward by the presence of liquid state fuel. However, the spring force of the spring 13 urging the closing means 12 is selected such that, in a roll-over condition of the vehicle, the spring maintains the closing means 12 in the valve closed position, that is, the closing means 12 blocks the discharge outlet 10 urged by the spring 13 against the buoyancy of the float 6.

Thus, according to the above, leakage of liquid state fuel in a vehicle roll-over condition is suitably prevented, while in a normal driving condition pressure build-up in the fuel tank is limited to a selected level and further, spillage of fuel during vehicle turning etc., is prevented.

Figure 4:
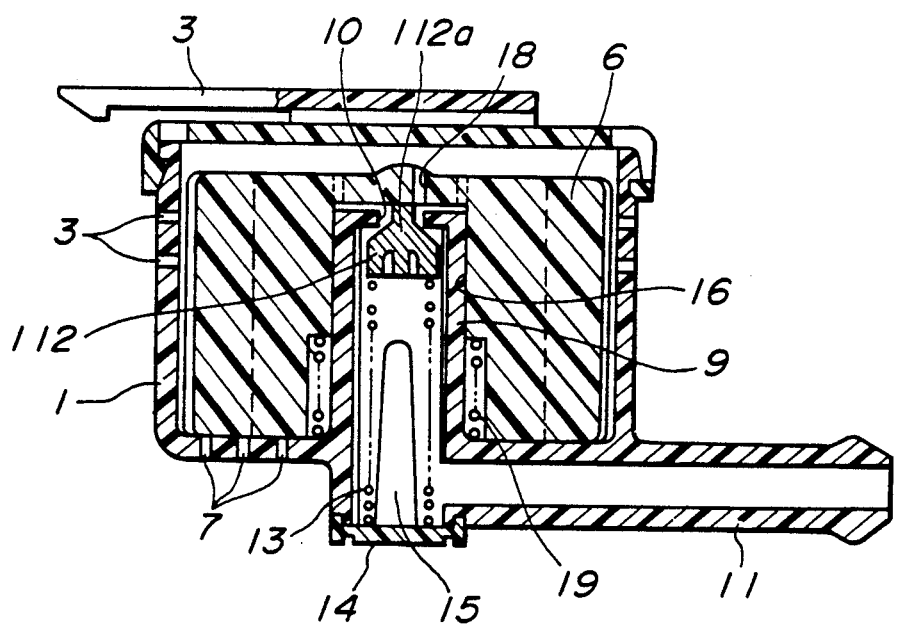
FIG. 4 is a cross-sectional view of a second embodiment of a fuel interrupt/pressure release valve arrangement according to the invention.

FIG. 4 shows a second embodiment of a fuel interrupt/pressure release valve arrangement according to the invention. The second embodiment will be described using like numbers for like parts and omitting redundant description corresponding to that of the previous embodiment.

Referring to FIG. 4, it will be noted that a closing means 112 thereof is substantially conical in form and includes a projecting portion 112a projecting toward the discharge opening 10. According to this embodiment, the projecting portion 17 is not required, and similarly to the previous embodiment, the projecting portion 112a of the closing means 112 is normally in touching contact with a bottom surface of the upper portion of the indentation 16. In other respects the above-described embodiment is identical to the first embodiment and enjoys all the advantages thereof.

Figure 5:
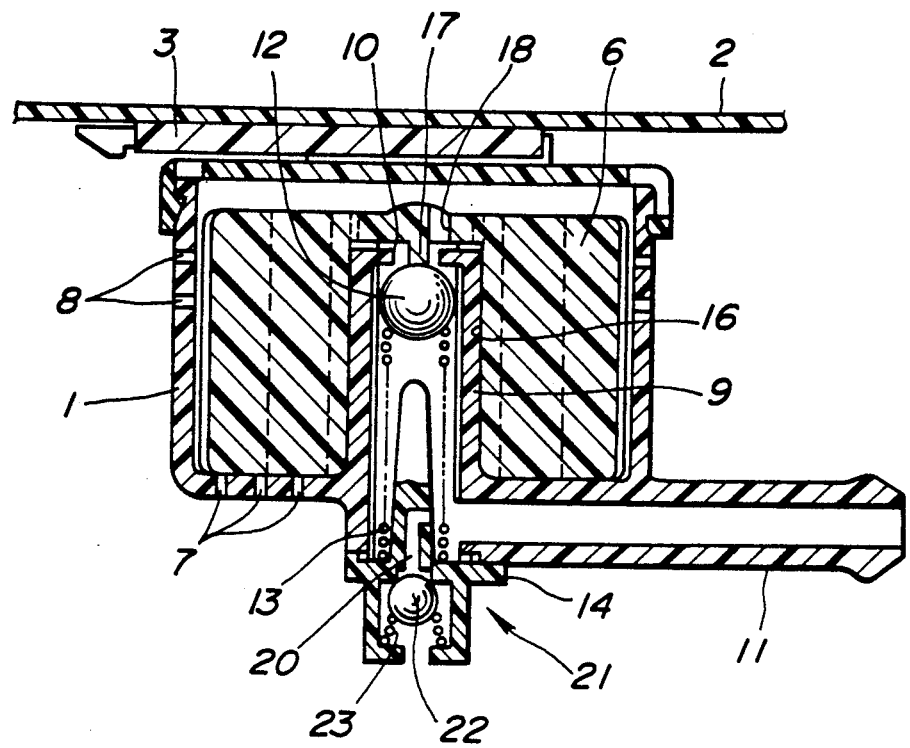
FIG. 5 is a cross-sectional view of a third embodiment of a fuel interrupt/pressure release valve arrangement according to the invention.

FIG. 5 shows a third embodiment of a fuel interrupt/pressure release valve arrangement according to the invention. As with the second embodiment described above, redundant description will be omitted for brevity.

Referring to FIG. 5, it will be noted that a check valve 21 is provided in the cap 14. Further, a connecting passage 20 is provided through the cap 14 communicating between the interior of the tank 2 and the interior of the valve housing 9. The check valve 21 includes a closing means 22, biased in an upward direction, so as to block the passage 20, by a spring 23. According to this construction, the passage 20 is opened only when the fluid pressure in the interior of the valve housing 9 exceeds the fluid pressure in the interior of the tank 2 by a predetermined amount. That is to say, when the above pressure condition exists, the pressure in the valve housing 9 becomes sufficient to push the closing means 22 down against the spring force of the spring 23 to release excess pressure back into the tank interior. Further, according to the above-described construction, the closing means 12 closes the discharge opening 10 when the pressure in the housing 9 exceeds that within the tank 2 until the pressure in the tank 2 interior exceeds a predetermined amount, thus affecting the weight of the float 6 so as to push the closing means 12 down against the spring force of the spring 13 to reopen the discharge opening 10.

As for the evaporation tube 5 and the associated canister 4, at a time when the tank 2 is being filled and an upper opening thereof is sealed, if fluid pressure within the tank 2 rises above a certain level, in order to regulate a surface level of fuel in the tank, a positive pressure valve is required or, alternatively, if pressure in the tank 2 falls below a certain level, a negative pressure valve is required. In such case, according to the construction of the above described third embodiment, in the case of exceedingly high pressure, during tank filling for example, the closing means 12 and spring 13 can act as a positive pressure valve opening to release excess pressure to the outlet 11, the evaporation tube 5 and the canister 4. Conversely, when pressure in the tank is excessively low, the closing means 22 and the spring 23 act as a negative pressure valve, allowing an ambient pressure outside the tank to enter through the canister 4, through the evaporation tube 5 to enter the tank 2 interior via the passage 20. Thus the above-described third embodiment may reduce manufacturing costs by eliminating the need to provide separate positive and negative pressure valves.

Figure 6:
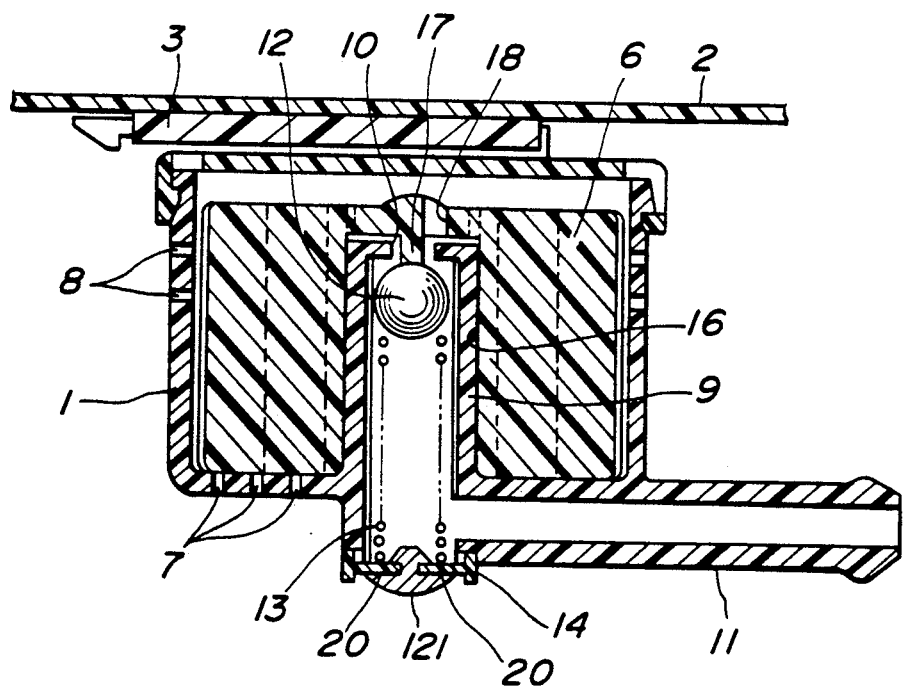
FIG. 6 is a cross-sectional view of a fourth embodiment of a fuel interrupt/pressure release valve arrangement according to the invention.

FIG. 6 shows a fourth embodiment of a fuel interrupt/pressure release valve arrangement according to the invention. The fourth embodiment functions substantially as the above-described third embodiment except that a check valve 121 is provided in the cap 14 rather than a ball and spring arrangement. The check valve 121 is of a normally closed one piece rubber construction. Instead of pressure in the valve housing acting against the spring force of a spring, the check valve 121 of the present embodiment has elastic properties determined so as to open a passage therethrough according to a predetermined pressure in the valve housing 6. Thus, according to the above, the advantages of the above-described third embodiment are available at lower cost.

Figure 7:
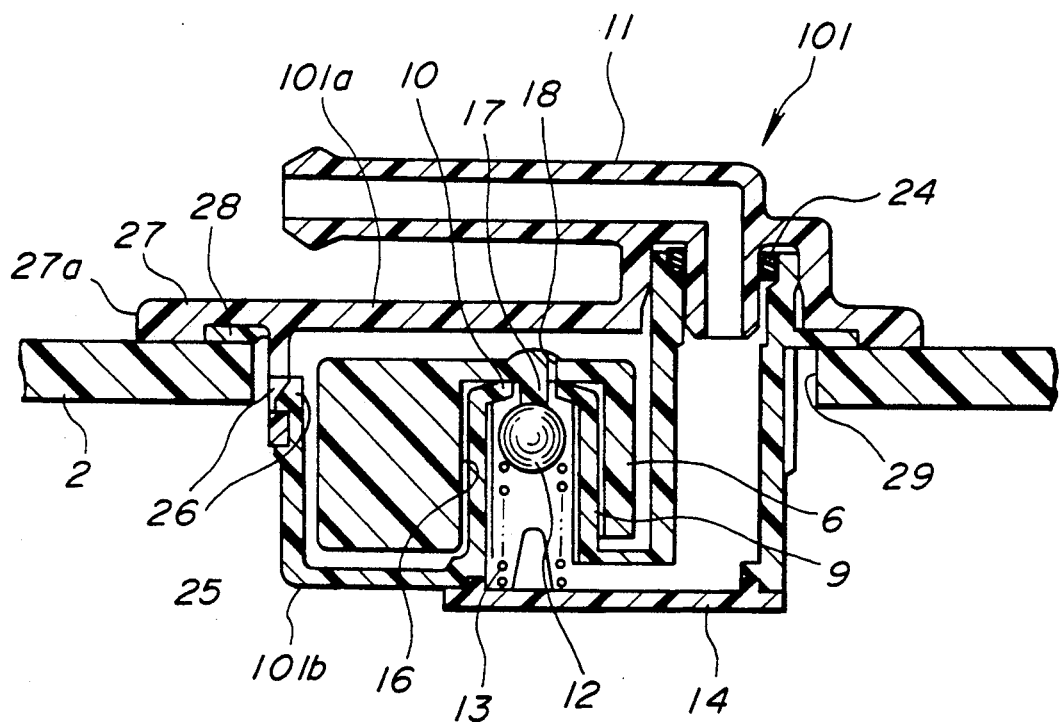
FIG. 7 is a cross-sectional view of a fifth embodiment of a fuel interrupt/pressure release valve arrangement according to the invention.

FIG. 7 shows a fifth embodiment of a fuel interrupt/pressure release valve arrangement according to the invention. According to the present embodiment, instead of a bracket mounted to an interior portion of the tank 2, the fuel interrupt/pressure release valve arrangement of the fifth embodiment is designed to be attached over an opening 29 provided in an upper portion of the tank 2, thus sealing the opening. According to this construction, the tank interior, or lower casing 101b, the valve housing 9, may be integrally formed and the tank exterior, or upper, casing 101a, and the outlet 11 also may be integrally formed. For assembly, the lower casing 101b is provided with a hook portion 25 for engaging a groove 26 provided in the upper casing 101a for joining the upper and lower casing 101a and 101b after installing the float 6, further, a seal, such as an O-ring for example, is provided in the vicinity of a portion where the lower casing 101b contacts the outlet portion 11 of the upper casing 101a. According to this construction the upper and lower casings 101a and 101b are formed with flange portions 27 and 28 respectively for providing sufficient sealing. Of course, although the present embodiment recites a hook 25 on the lower casing 101b and a groove 26 on the upper casing 101a, this arrangement may be reversed without affecting the characteristics of the invention. Functionally the arrangement of the present embodiment is substantially identical to the above-described first embodiment.

Also, according to the above-described fifth embodiment, cost is further reduced due to the lower number of parts and installation is simplified thus reducing assembly cost and complexity.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A fuel interrupt/pressure release valve arrangement for a fuel tank, comprising:
    casing mounted on an upper interior surface of the fuel tank and including openings communicating between an interior of said fuel tank and an interior of said casing;
    a valve housing including a discharge opening at one end thereof;
    biasing means positioned within said valve housing and biased in the direction of said discharge opening;
    closing means urged by said biasing means to a valve closed position in which said closing means blocks said discharge opening;
    outlet means communicating with said valve housing; and
    a float, formed separately from said closing means, said float having an indentation for loosely receiving said valve housing, a through hole being formed through said float at an apex of said indentation and a protrusion formed in the vicinity of said through hole said protrusion projecting in an opening direction of said valve so as to be normally in touching contact with said closing means, a buoyancy of said float being so determined as to be urged in a valve closing direction by the presence of liquid state fuel in said casing and to be urged in a valve opening direction proportionally according to a degree of fluid pressure of evaporated fuel in said casing, the buoyancy determined for said float being less than an urging force of said biasing means by a predetermined degree.

2. A fuel interrupt/pressure release valve arrangement as set forth in claim 1, wherein said outlet means is connected to an evaporation tube, said evaporation tube being connected to a canister positioned outside of said fuel tank.

3. A fuel interrupt/pressure release valve arrangement as set forth in claim 1, wherein said valve housing is formed integrally with said casing.

4. A fuel interrupt/pressure release valve arrangement as set forth in claim 1, wherein said outlet means, said valve housing and said casing are integrally formed.

5. A fuel interrupt/pressure release valve arrangement as set forth in claim 1, wherein an end of said valve housing opposite said discharge opening is sealed by a cap, said cap including a stopper portion projecting into said valve house and limiting a range of movement of said closing means.

6. A fuel interrupt/pressure release valve arrangement as set forth in claim 1, wherein said closing means is a ball.

7. A fuel interrupt/pressure release valve arrangement as set forth in claim 1, wherein said closing means is substantially conical in form and includes a projecting portion projecting toward said discharge opening.

8. A fuel interrupt/pressure release valve arrangement as set forth in claim 1, wherein said biasing means is a coil spring.

9. A fuel interrupt/pressure release valve arrangement as set forth in claim 1, wherein a mounting bracket is formed on an outer surface of said casing.

10. A fuel interrupt/pressure release valve arrangement as set forth in claim 1, further including a check valve associated with a portion of said valve housing, said check valve having an opening pressure thereof selected so as to permit fluid communication from said interior of said valve housing to said interior of said fuel tank in response to a predetermined pressure difference therebetween.

11. A fuel interrupt/pressure release valve arrangement as set forth in claim 10, wherein said check valve comprises a check valve closing means biased in a check valve closing direction by a coil spring.

12. A fuel interrupt/pressure release valve arrangement as set forth in claim 11, wherein said check valve closing means is a ball.

13. A fuel interrupt/pressure release valve arrangement as set forth in claim 10, wherein said check valve comprises a rubber member, an elasticity thereof being selected so as to permit fluid communication from said interior of said valve housing to said interior of said fuel tank in response to a predetermined pressure difference therebetween.

* * * * *